United States Patent
Koyama et al.

(10) Patent No.: US 12,208,519 B2
(45) Date of Patent: Jan. 28, 2025

(54) MULTI-AXIS ROBOT AND CONTROL METHOD THEREFOR, AND WORK TOOL

(71) Applicant: Kawasaki Jukogyo Kabushiki Kaisha, Kobe (JP)

(72) Inventors: Masataka Koyama, Kobe (JP); Shinsuke Hamatani, Kobe (JP); Naohiro Otsuki, Kobe (JP); Daiki Kubo, Kobe (JP); Takuya Kawamura, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 285 days.

(21) Appl. No.: 17/788,741

(22) PCT Filed: Dec. 25, 2020

(86) PCT No.: PCT/JP2020/048923
§ 371 (c)(1),
(2) Date: Jun. 24, 2022

(87) PCT Pub. No.: WO2021/132632
PCT Pub. Date: Jul. 1, 2021

(65) Prior Publication Data
US 2023/0042999 A1 Feb. 9, 2023

(30) Foreign Application Priority Data
Dec. 27, 2019 (JP) .................................. 2019-237748

(51) Int. Cl.
*B25J 9/10* (2006.01)
*B25J 15/00* (2006.01)

(52) U.S. Cl.
CPC ............. *B25J 9/1015* (2013.01); *B25J 9/106* (2013.01); *B25J 15/0019* (2013.01)

(58) Field of Classification Search
CPC ...... B25J 9/1015; B25J 9/106; B25J 15/0019; B25J 9/0027; B25J 9/1687; B25J 11/00;
(Continued)

(56) References Cited

U.S. PATENT DOCUMENTS

| 4,624,621 A | 11/1986 | Murakami et al. |
| 8,997,599 B2 * | 4/2015 | Maisonnier .......... B25J 17/0275 74/490.06 |

(Continued)

FOREIGN PATENT DOCUMENTS

| JP | 3-245987 A | 11/1991 |
| JP | 4-159095 A | 6/1992 |

(Continued)

OTHER PUBLICATIONS

Supplementary European Search Report mailed Nov. 29, 2023, in European Application No. 20905883.3, 10 pages.
(Continued)

*Primary Examiner* — Kira Nguyen
(74) *Attorney, Agent, or Firm* — XSENSUS LLP

(57) ABSTRACT

A multi-axis robot includes: a robot main body including a head and a movement mechanism that three-dimensionally moves the head; and a work tool attached to the head. The work tool includes: a first link pivotally supported on the head; a second link pivotally supported on a distal end of the first link; a first change mechanism that changes an angle of the first link to a central axis of the head; and a second change mechanism that changes an angle of the second link to the first link.

16 Claims, 11 Drawing Sheets

(58) Field of Classification Search
CPC ...... B05B 13/0431; G05B 2219/45065; G05B 2219/45238; B05C 5/0216
See application file for complete search history.

(56) References Cited

U.S. PATENT DOCUMENTS

| | | | |
|---|---|---|---|
| 10,718,413 B2* | 7/2020 | Xiong | F16H 7/023 |
| 2006/0182601 A1 | 8/2006 | Nagai et al. | |
| 2013/0209209 A1* | 8/2013 | Fukudome | B25J 9/0051 |
| | | | 901/27 |
| 2019/0152046 A1* | 5/2019 | Konagai | B25J 5/04 |

FOREIGN PATENT DOCUMENTS

| | | |
|---|---|---|
| JP | H06-008182 A | 1/1994 |
| JP | 8-1796 A | 1/1996 |
| JP | 2006-7332 A | 1/2006 |

OTHER PUBLICATIONS

Kuka-Robots & Automation: "Automated application of adhesives and sealants", Oct. 29, 2019,XP 93103905, Retrieved from the Internet: https://www.youtube.com/watch?v=HR00-gv5tPI.

* cited by examiner

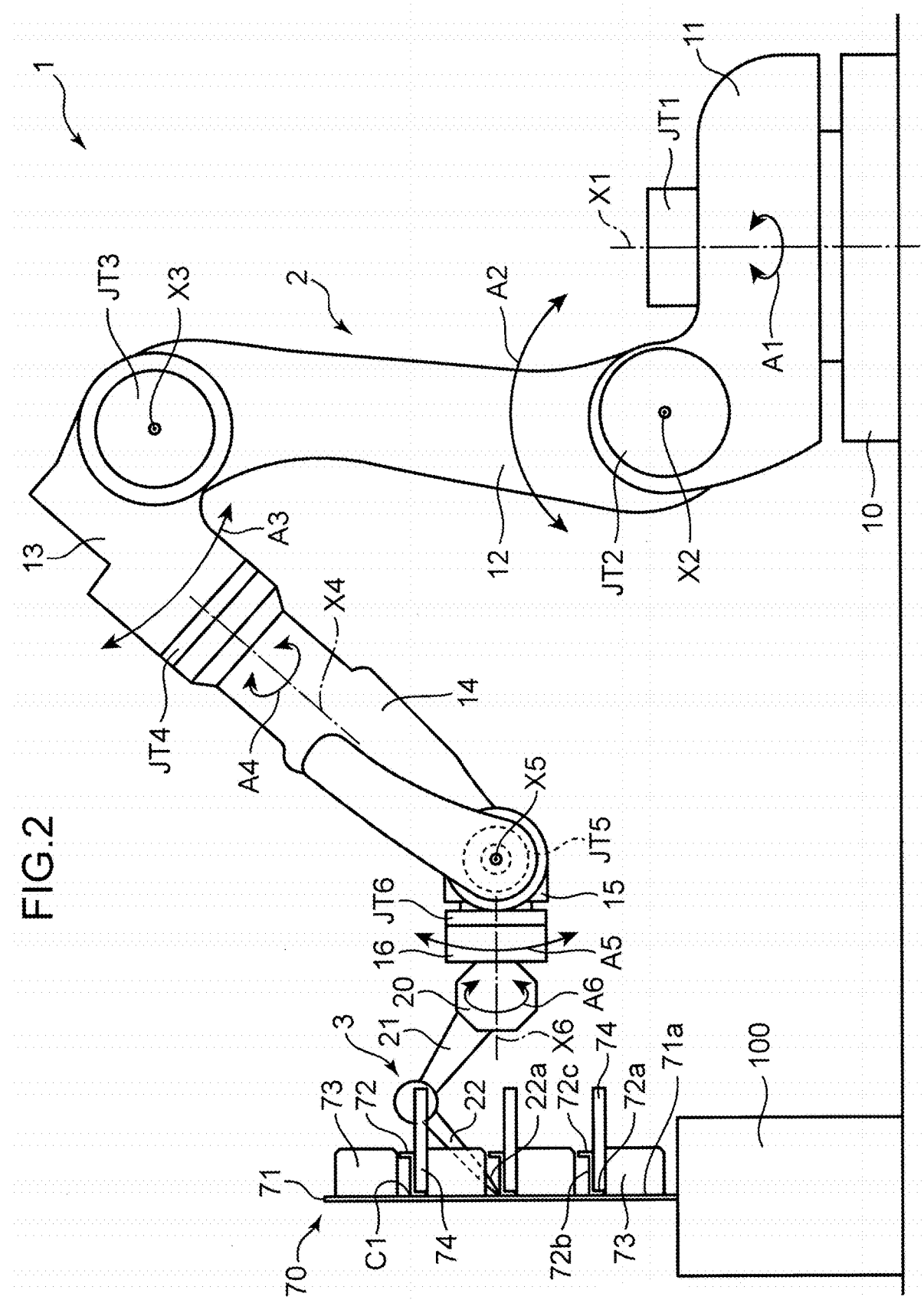

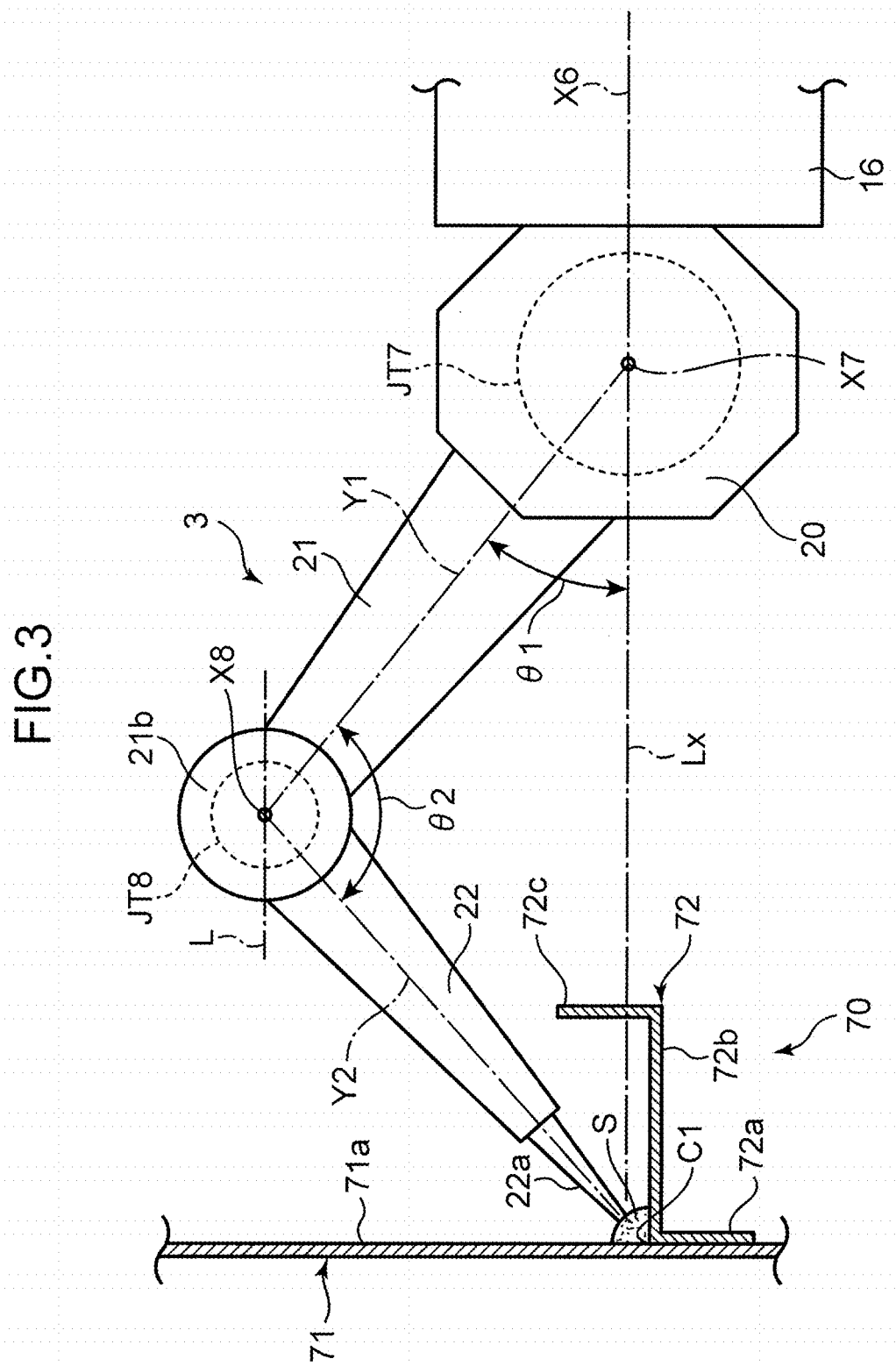

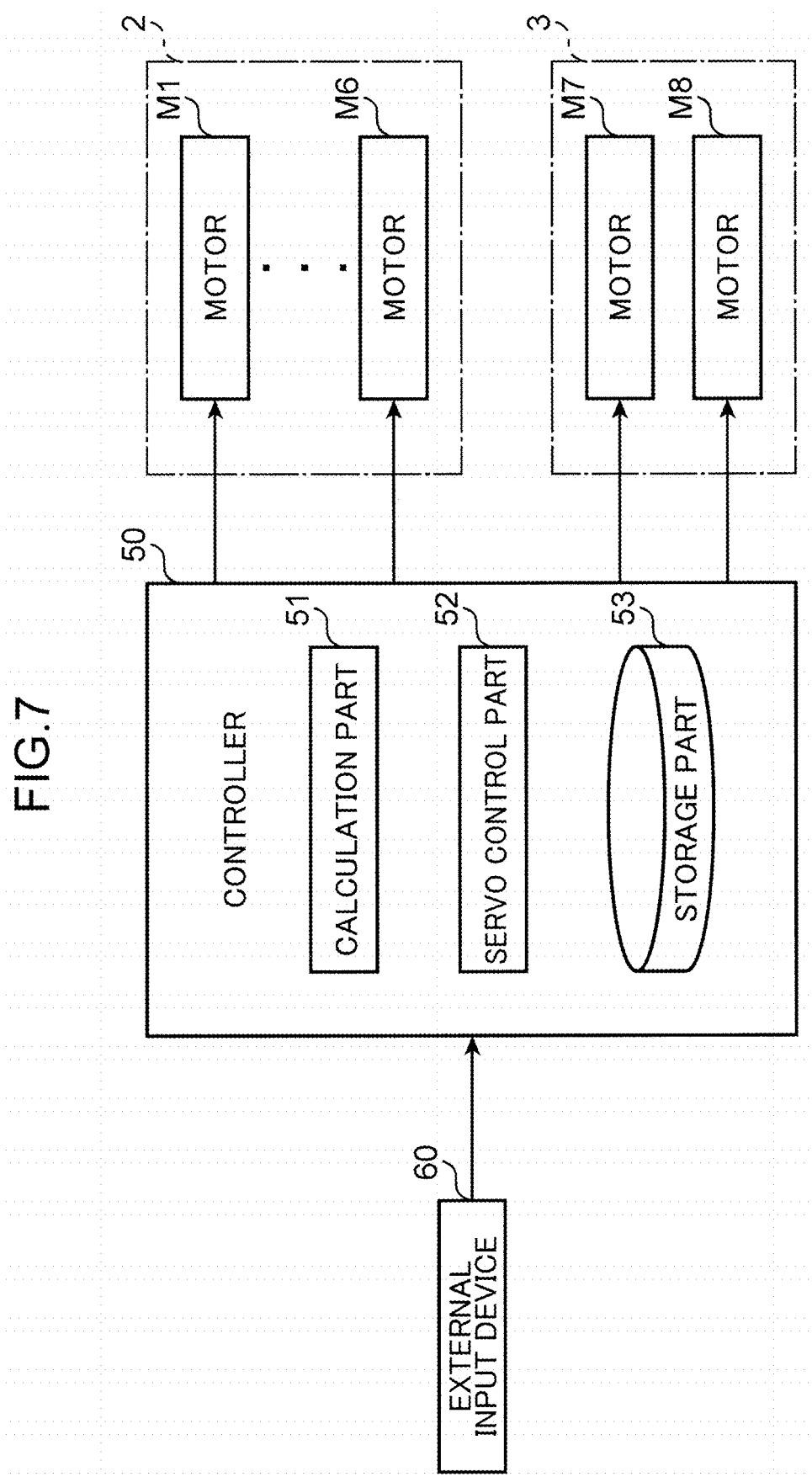

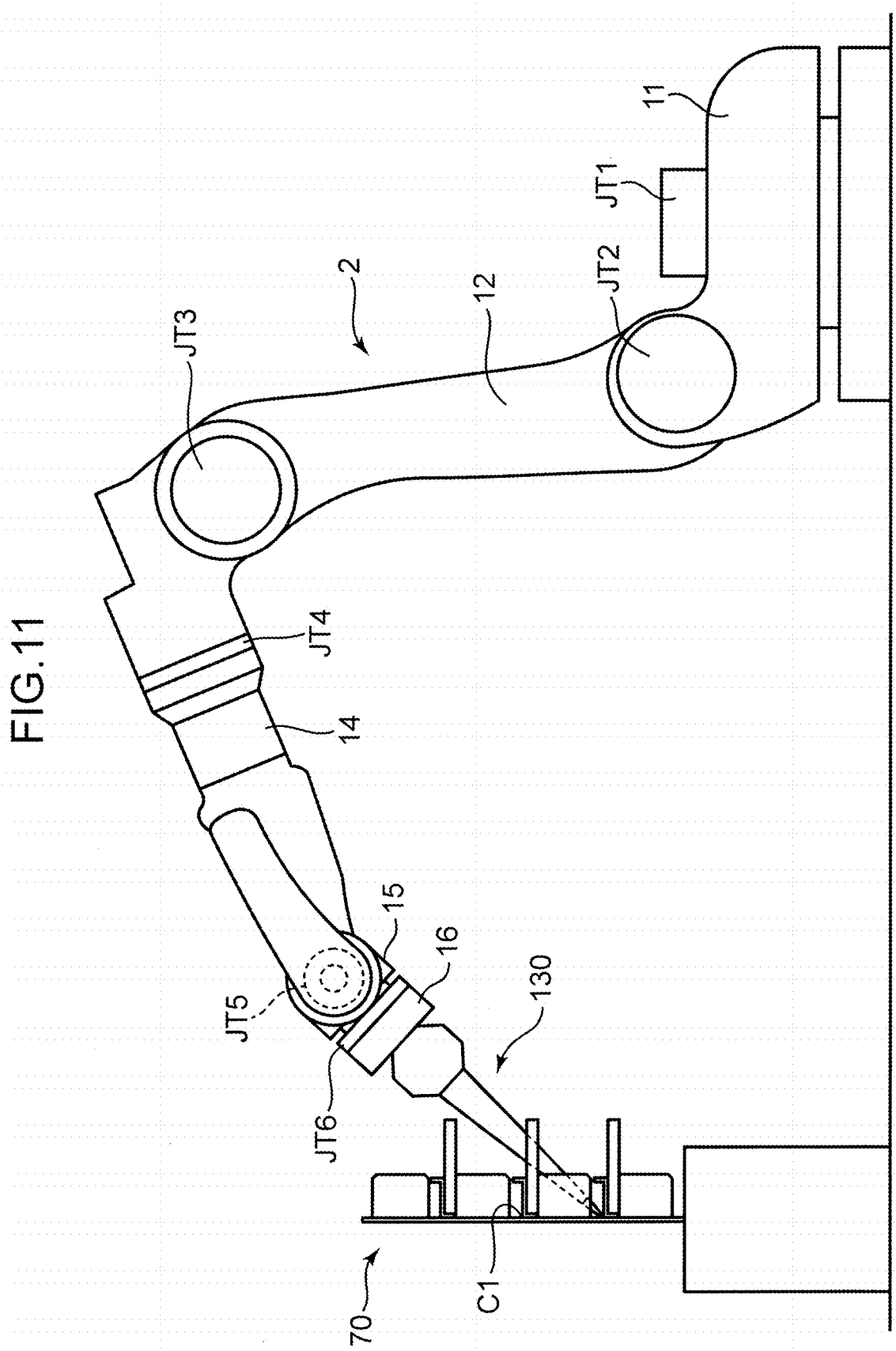

MULTI-AXIS ROBOT AND CONTROL METHOD THEREFOR, AND WORK TOOL

CROSS-REFERENCE TO RELATED APPLICATIONS

The present application is based on PCT filing PCT/JP2020/048923, filed Dec. 25, 2020, which claims priority to JP 2019-237748, filed Dec. 27, 2019, the entire contents of each are incorporated herein by reference.

TECHNICAL FIELD

The present invention relates to a multi-axis robot that performs a predetermined work while moving along a shape of a workpiece and to a work tool for use in the multi-axis robot.

BACKGROUND ART

A work tool for use in a multi-axis robot as described in Patent Literature 1 has been known. The work tool described in Patent Literature 1 is intended for a work of applying sealant on a workpiece and is attached to a robot wrist at a distal end of the multi-axis robot or industrial robot having degrees of freedom of motion. The work tool includes: a housing fixedly attached to the robot wrist; a motor provided in the housing; a ball-screw mechanism protruding from a lower end of the housing in an advanceable and retractable manner in response to a rotation of the motor; and a tool arm coupled to a lower end of the ball-screw mechanism. The tool arm includes a short secondary arm coupled to the lower end of the ball-screw mechanism via a pin and a long primary arm extending downward from an end of the secondary arm, and has an L-shape entirely. A connection portion where the secondary arm and the primary arm are connected to each other is pivotally supported by an arm holder provided at the lower end of the housing via a pin.

The work tool having the structure described above according to Patent Literature 1 can swing the L-shaped tool arm over a predetermined angle by causing the ball-screw mechanism to move away from or toward the housing in response to the rotation of the motor. The swinging of the tool arm is considered to lead to an increase in the degrees of freedom of motion and be useful for prevention of contact between the workpiece and the work tool.

However, Patent Literature 1 directed to the mechanism of causing the tool arm having the L-shape or a given shape to swing about the robot wrist has a drawback of not high expectation for the prevention of the contact with the workpiece. Specifically, the work tool of Patent Literature 1 may avoid the contact in a work on a workpiece having a specific shape, but may fail to avoid the contact when used for another workpiece having a different shape even by swinging the tool arm to any position. This necessitates, for example, replacement of the tool arm itself with another one having a corresponding shape. The replacement needs an extra time and the work efficiency is reduced accordingly. In other words, the technique of Patent Literature 1 has a drawback of failure to efficiently perform a work on various kinds of workpieces with the same work tool.

CITATION LIST

Patent Literature

Patent Literature 1: Japanese Unexamined Patent Publication No. HEI 4-159095

SUMMARY OF INVENTION

The present invention has been achieved in view of the aforementioned circumstances, and has an object to provide a work tool which can efficiently perform a work on various kinds of workpieces having different shapes while avoiding contact with the workpiece, and a multi-axis robot including the work tool.

To overcome the aforementioned drawback, a multi-axis robot according to an aspect of the present invention performs a predetermined work while moving along a shape of a workpiece. The multi-axis robot includes: a robot main body including a head and a movement mechanism that three-dimensionally moves the head; and a work tool attached to the head. The work tool includes: a first link pivotally supported on the head; a second link pivotally supported on a distal end of the first link; a first change mechanism that changes a first angle being an angle of the first link to a central axis of the head; and a second change mechanism that changes a second angle being an angle of the second link to the first link.

A work tool according to another aspect of the present invention is attached to a head of a multi-axis robot that moves along a shape of a workpiece. The work tool includes: a first link pivotally supported on the head; a second link pivotally supported on a distal end of the first link; a first change mechanism that changes a first angle being an angle of the first link to a central axis of the head; and a second change mechanism that changes a second angle being an angle of the second link to the first link.

A control method according to further another aspect is a method for controlling the multi-axis robot. The method includes: a first step of moving a tip of the second link to an initial working position of the workpiece; a second step of adjusting each of the first angle and the second angle to a predetermined angle before the tip of the second link reaches the initial working position; and a third step of moving the tip of the second link from the initial working position along the shape of the workpiece while keeping the first angle and second angle.

A multi-axis robot according to still another aspect of the present invention performs a predetermined work while moving along a shape of a workpiece. The multi-axis robot includes: a robot main body including a head and a movement mechanism that three-dimensionally moves the head; and a work tool attached to the head. The work tool includes: a first link pivotally supported on the head; a second link extending from a distal end of the first link in a direction different from a central axis of the first link; and a change mechanism that changes a first angle being an angle of the central axis of the first link to a central axis of the head. The change mechanism adjusts the first angle in such a manner that a center line of the first link and a center line of the second link intersect with an extension line of the central axis of the head, and that a tip of the second link is closer to the extension line.

A work tool according to still further another aspect of the present invention is attached to a head of a multi-axis robot that moves along a shape of a workpiece. The work tool includes: a first link pivotally supported on the head; a second link extending from a distal end of the first link in a direction different from a central axis of the first link; and a change mechanism that changes a first angle being an angle of the central axis of the first link to a central axis of the head. The change mechanism adjusts the first angle in such a manner that a center line of the first link and a center line of the second link intersect with an extension line of the central axis of the head, and that a tip of the second link is closer to the extension line.

BRIEF DESCRIPTION OF DRAWINGS

FIG. 2 is a side view of the work robot.

FIG. 3 is a partly enlarged view of FIG. 2.

FIG. 4 includes explanatory views of a structure of a work tool included in the work robot, specifically.

FIG. 5 includes perspective views of an enlarged distal end of the work tool, specifically.

FIG. 7 is a block diagram showing a control system of the work robot.

FIG. 11 corresponding to FIG. 2 illustrates a comparative example for explaining operations in the embodiment.

DESCRIPTION OF EMBODIMENTS

Overall Configuration of Robot

Figure 1:
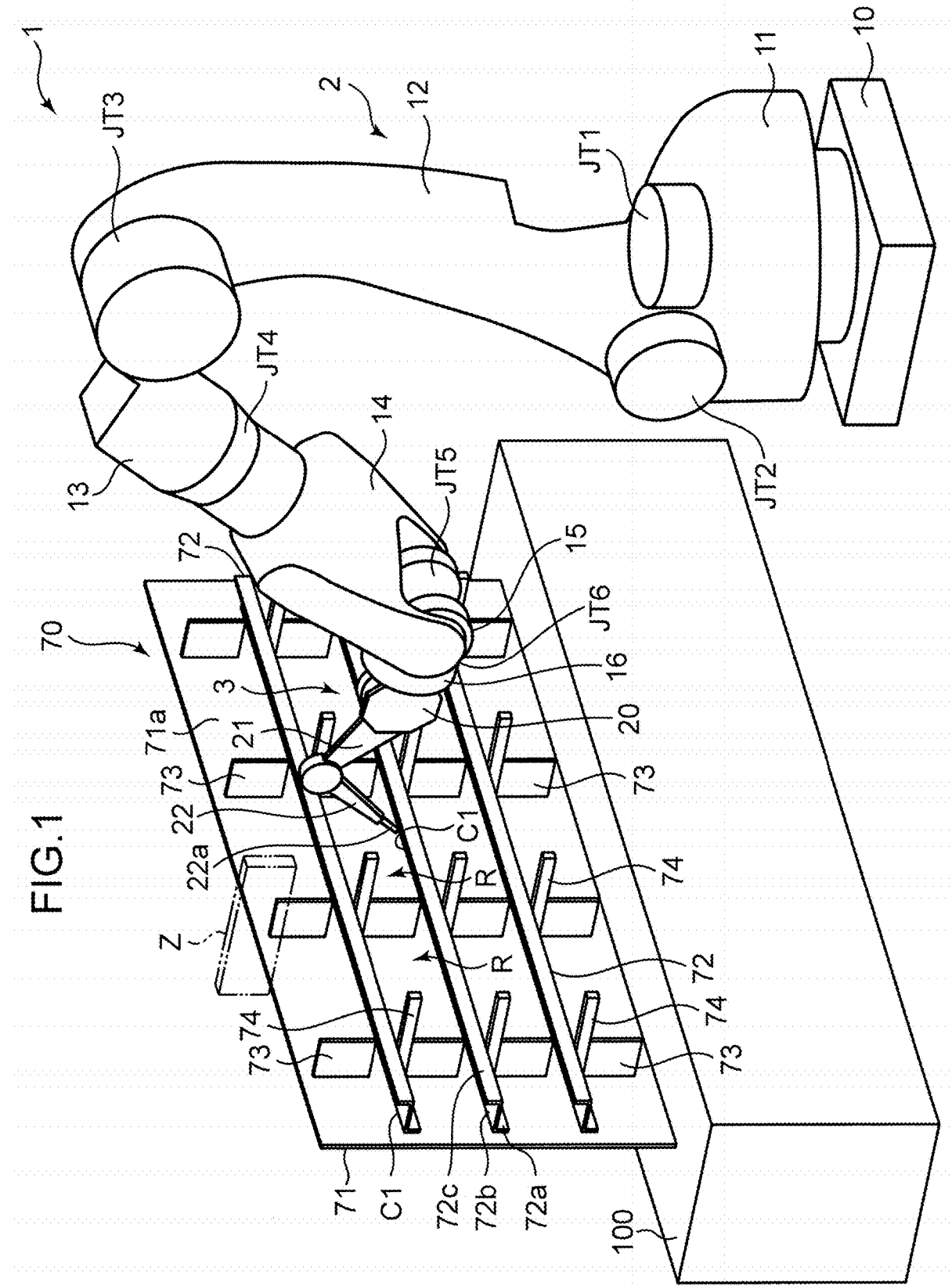
FIG. 1 is a perspective view showing a work robot or multi-axis robot according to an embodiment of the present invention.

FIG. 1 and FIG. 2 are respectively a perspective view and a side view showing a work robot 1 according to an embodiment of the present invention. FIG. 3 is a partly enlarged view of FIG. 2. The work robot 1 is an example of a multi-axis robot according to the present invention and applies sealant S (FIG. 3) or smooths the sealant S having been applied. The work robot 1 includes: a robot main body 2 of six-axis type having six arm joints JT1 to JT6; and a work tool 3 attached to a distal end of the robot main body 2. The arm joints JT1 to JT6 correspond to the "movement mechanism" in the present invention.

The robot main body 2 includes: a base 10; a first arm link 11 connected to the base 10 via the first arm joint JT1; a second arm link 12 connected to the first arm link 11 via the second arm joint JT2; a third arm link 13 connected to the second arm link 12 via the third arm joint JT3; a fourth arm link 14 connected to the third arm link 13 via the fourth arm joint JT4; a fifth arm link 15 connected to the fourth arm link 14 via the fifth arm joint JT5; and a head 16 serving as a sixth arm link and connected to the fifth arm link 15 via the sixth arm joint JT6.

As shown in FIG. 2, the first arm joint JT1 causes the first arm link 11 to rotate about a first arm axis X1 extending in a vertical direction with respect to the base 10, as denoted by arrow A1. The second arm joint JT2 causes the second arm link 12 to swing about a second arm axis X2 extending in a horizontal direction with respect to the first arm link 11, as denoted by arrow A2. The third arm joint JT3 causes the third arm link 13 to swing about a third arm axis X3 extending in a horizontal direction with respect to the second arm link 12, as denoted by arrow A3. The fourth arm joint JT4 causes the fourth arm link 14 to rotate about a fourth arm axis X4 serving as a central axis of a distal end of the third arm link 13 with respect to the third arm link 13, as denoted by arrow A4. The fifth arm joint JT5 causes the fifth arm link 15 to swing about a fifth arm axis X5 extending in a horizontal direction with respect to the fourth arm link 14, as denoted by arrow A5. The sixth arm joint JT6 causes the head 16 to rotate about a sixth arm axis X6 serving as a central axis of a distal end of the fifth arm link 15 with respect to the fifth arm link 15, as denoted by arrow A6. The first to sixth arm joints JT1 to JT6 respectively have motors M1 to M6 (FIG. 7) of electric type as their driving sources. The sixth arm link 16 and the fifth arm link 15 are coaxially provided, and the sixth arm axis X6 serves as a central axis of each of the fifth and sixth arm links 15, 16. Therefore, hereinafter, the central axis of the sixth arm link 16 is called a "central axis X6 of the sixth arm link 16" by using the same reference sign as that of the sixth arm axis X6.

Details of Work Tool

Figure 4A:
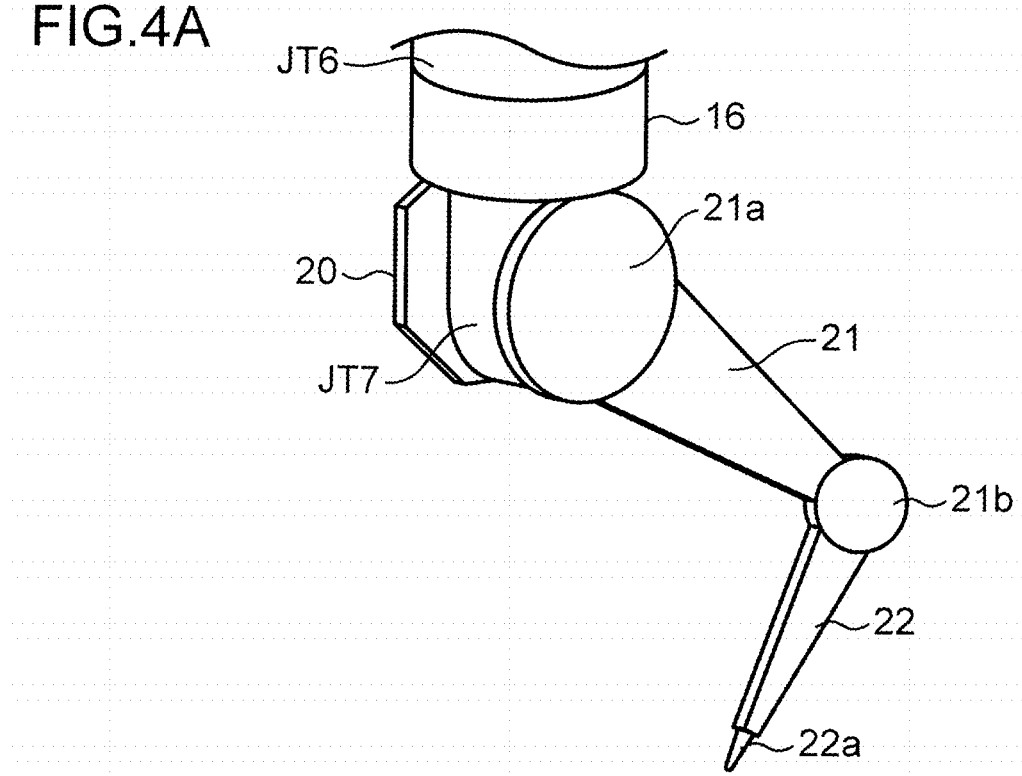
FIG. 4A is a perspective view and FIG. 4B is a side view.
Figure 4B:
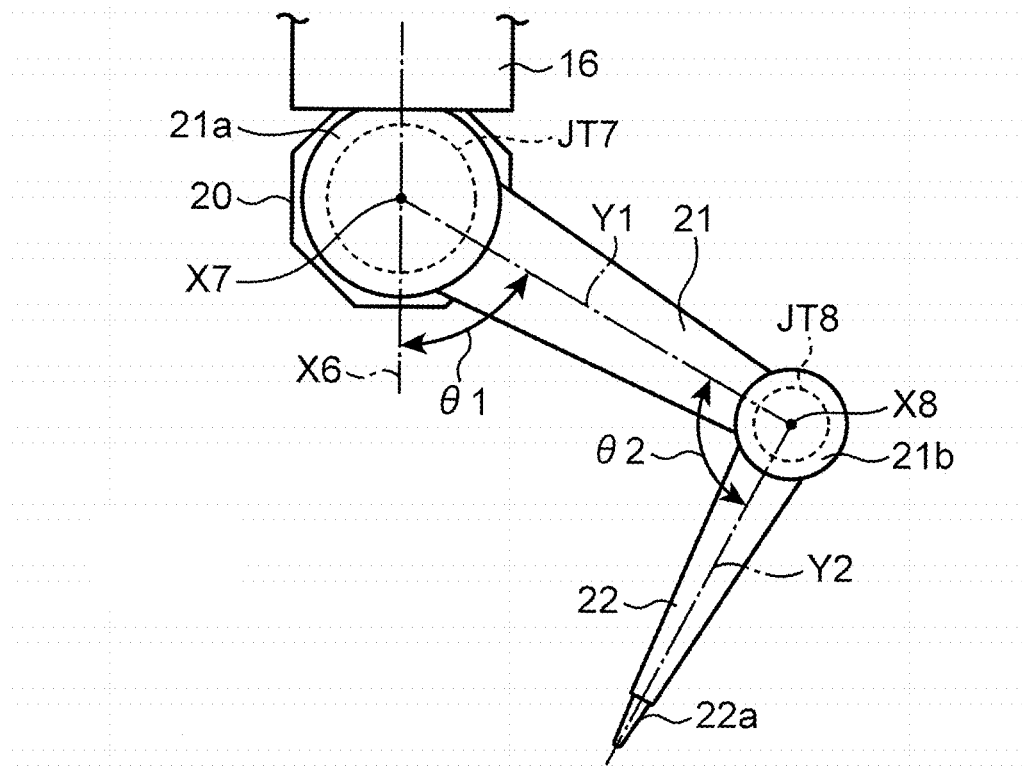

FIG. 4A is a perspective view of the work tool 3 and the periphery therearound seen at an angle different from that in FIG. 1, and FIG. 4B is a side view thereof. As shown in the drawing and the preceding FIG. 1 to FIG. 3, the work tool 3 includes: a base part 20; a first link 21; a second link 22; a first joint JT7; and a second joint JT8. The base part 20 is detachably attached to the head 16 of the robot main body 2 via a fastener. The first link 21 straightly extends from the base part 20. The second link 22 straightly extends from a distal end of the first link 21. The first joint JT7 represents an example of the "first change mechanism" in the present invention, and connects the base part 20 and the first link 21 to each other in such a manner as to change an angle. The second joint JT8 represents an example of the "second change mechanism", and connects the first link 21 and the second link 22 to each other in such a manner as to change an angle. In the embodiment, a ratio between a length of the first link 21 and a length of the second link 22 is set to substantially 1:1.

The first link 21 includes, for example, a proximal end 21a having a disc shape and a distal end 21b having a disc shape with a diameter smaller than that of the proximal end 21a as shown in FIG. 4. The proximal end 21a is rotatably attached to the base part 20. In other words, the first link 21 is pivotally supported on the head 16 via the base part 20.

Figure 5A:
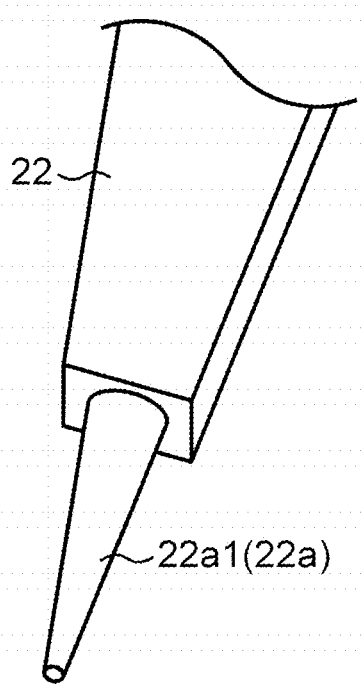
FIG. 5A shows a nozzle attached to the distal end.

The second link 22 includes a proximal end pivotally supported on the distal end 21b of the first link 21. The second link 22 includes a distal end tool section 22a at a distal end thereof. As shown in FIG. 5, the distal end tool section 22a may be a nozzle 22a1 that applies the sealant S (FIG. 3) on a workpiece being a work target, or a spatula 22a2 that smooths the sealant S applied on the workpiece. In the case where the distal end tool section 22a is the nozzle 22a1 (FIG. 5A), the work tool 3 additionally includes a syringe (not shown) that supplies the sealant S to the nozzle.

Figure 6A:
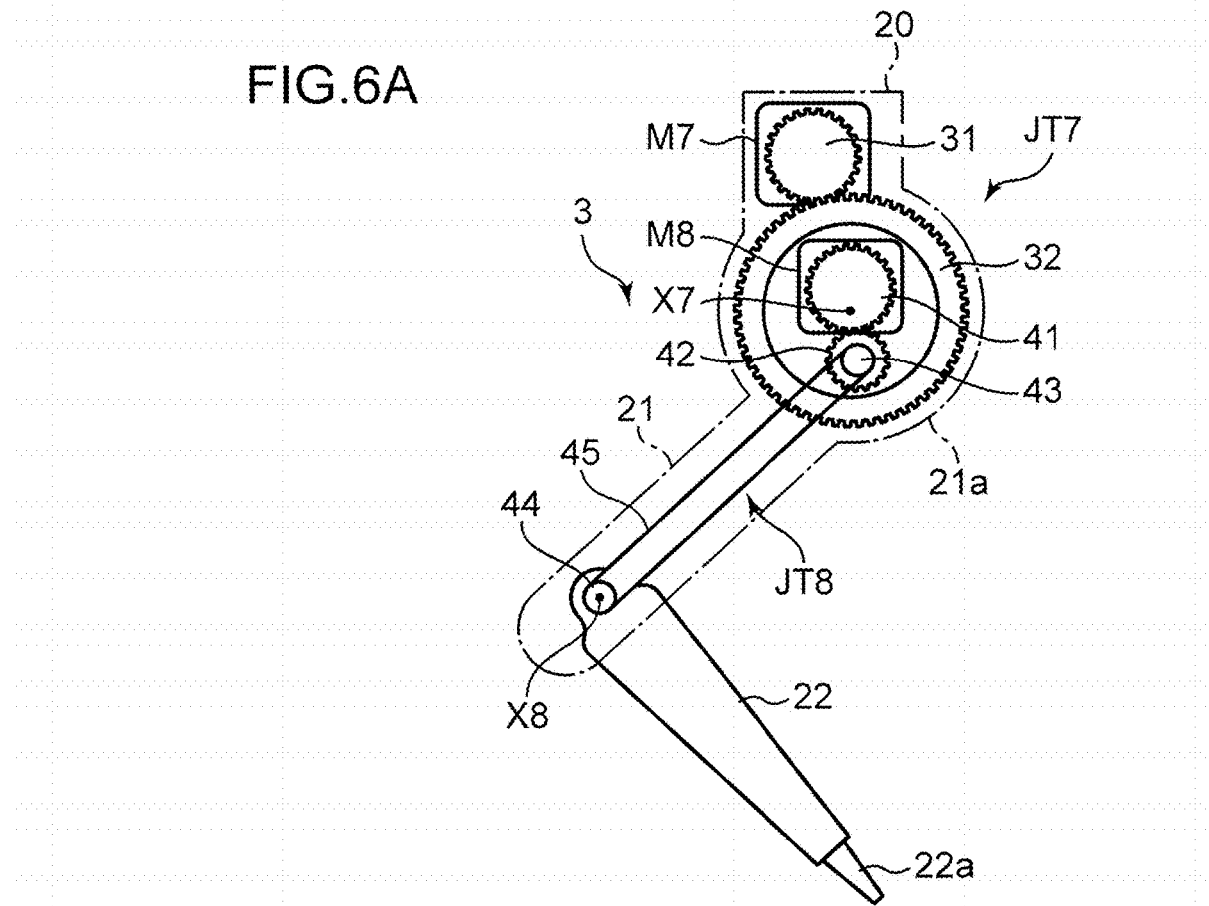
FIG. 6 schematically shows an inner structure of the work tool.
Figure 6B:
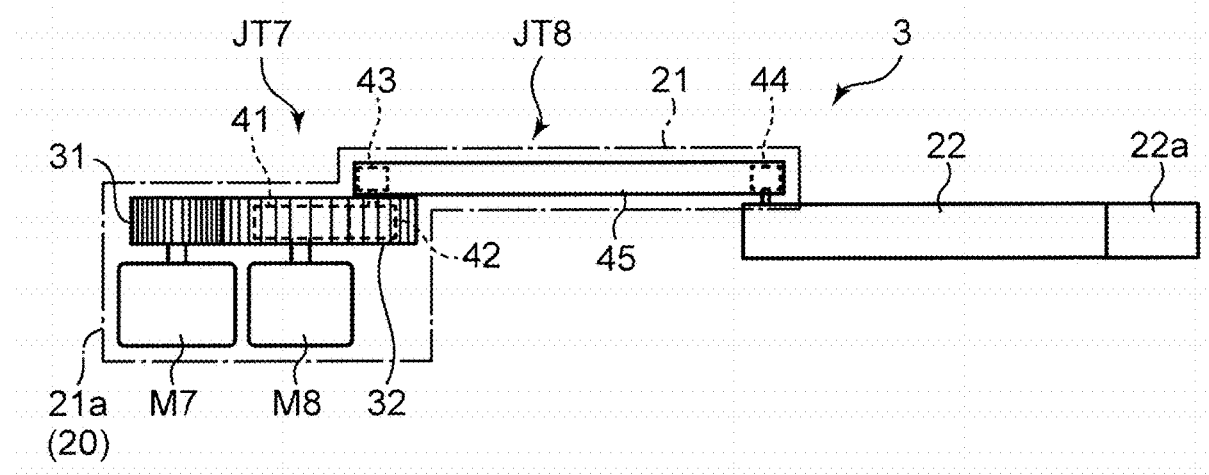

FIGS. 6A and 6B schematically show an inner structure of the work tool 3. As shown in the drawing, the first joint JT7 is a mechanism causing the first link 21 to swing with respect to the base part 20, and can change an angle θ1 (FIG. 4B) between a center line Y1 of the first link 21 and a central axis X6 of the head 16 owing to the swinging. The second joint JT8 serves as the mechanism causing the second link 22 to swing with respect to the first link 21 and can change an angle θ2 (FIG. 4B) between a center line Y2 of the second link 22 and the center line Y1 of the first link 21 (FIG. 4B) owing to the swinging. Hereinafter, the angle θ1 is referred to as a first angle θ1 and the angle θ2 is referred to as a second angle θ2.

As shown in FIG. 6, the first joint JT7 includes the motor M7 of the electric type, a driving gear 31 driven by the motor M7 to rotate, and a driven gear 32 meshing with the driving gear 31. The driven gear 32 has a ring shape with a hollow at the center thereof, and is integrally coupled to the proximal end 21a of the first link 21. The driven gear 32 accommodates inside a part of the structural elements of the second joint JT8, i.e., a driving gear 41 and a driven gear 42 to be described later. The motor M7, the driving gear 31, and the driven gear 32 are disposed in the base part 20.

The second joint JT8 includes: the motor M8 of the electric type; the driving gear 41 driven by the motor M8 to rotate; the driven gear 42 meshing with the driving gear 41; a driving pulley 43 connected to the driven gear 42 coaxially therewith; a driven pulley 44 located away from the driving pulley 43; and a belt 45 looped over the driving pulley 43 and the driven pulley 44. The driven pulley 44 is integrally coupled to a proximal end of the second link 22. The driving gear 41 and the driven gear 42 are disposed in the base part 20, specifically, accommodated inside the driven gear 32 of the first joint JT7. The driving pulley 43, the driven pulley 44, and the belt 45 are disposed in the first link 21.

A rotation of the motor M7 in the first joint JT7 leads to an operation of causing the first link 21 to swing with respect to the base part 20, i.e., an operation of changing the first angle θ1. Specifically, when the motor M7 rotates, the rotation is transmitted to the driving gear 31 and the driven gear 32. Accordingly, the driven gear 32 and the first link 21 integrated therewith rotate about a first tool axis X7 serving as a central axis of the driven gear 32. Consequently, the first link 21 swings with respect to the base part 20, resulting in changing the first angle θ1 between the central axis X6 of the head 16 and the center line Y1 of the first link 21.

A rotation of the motor M8 in the second joint JT8 leads to an operation of causing the second link 22 to swing with respect to the first link 21, i.e., an operation of changing the second angle θ2. Specifically, when the motor M8 rotates, the rotation is transmitted to the driven pulley 44 via the driving gear 41, the driven gear 42, the driving pulley 43, and the belt 45. Accordingly, the driven pulley 44 and the second link 22 integrated therewith rotate about a second tool axis X8 serving as a central axis of the driven pulley 44. Consequently, the second link 22 swings with respect to the first link 21, resulting in changing the second angle θ2 between the center line Y1 of the first link 21 and the center line Y22 of the second link 22.

Control System

FIG. 7 is a block diagram showing a control system of the work robot 1 according to the embodiment. A controller 50 shown in this drawing aims at totally controlling the work robot 1, and includes a microprocessor having a CPU, an RAM, and a ROM each commonly known. Moreover, an external input device 60 receives an input of teaching data, such as shape data of the workpiece, and includes a versatile computer. The external input device 60 is electrically connected to the controller 50 for the input of the data if necessary. The controller 50 is electrically connected to the parts of the work robot 1. Specifically, The controller 50 is electrically connected to the motors M1 to M6 to respectively move the arm joints JT1 to JT6 of the robot main body 2, and further electrically connected to the motors M7, M8 to respectively move the joints JT7, JT8 of the work tool 3.

The controller 50 functionally includes a calculation part 51, a servo control part 52, and a storage part 53. The storage part 53 is a storage medium storing various data, set values, programs and the like required to control the work robot 1. The servo control part 52 is a module that controls the motors M1 to M6 of the robot main body 2 and the motors M7, M8 of the work tool 3. The calculation part 51 is a module that calculates, based on given data (conditions), an instructive value to be output to the motors M1 to M8.

Control Operation Example

Next, a specific operation of the work robot 1 under the control by the controller 50 will be described. Here, first, described is a case where a work target (workpiece) of the work robot 1 is represented by a structure 70 shown in FIG. 1 and FIG. 2, and a work of applying the sealant S (FIG. 3) on the structure 70 is performed by the work robot 1.

The structure 70 includes a base plate 71 supported on a workbench 100 in a standing manner, and horizontal plates 72, vertical plates 73, and protrusions 74, each attached to the base plate 71. The horizontal plate 72 is a plate member longitudinally extending in the horizontal direction. The vertical plate 73 is a rectangular plate member extending in an up-down direction. The protrusion 74 is a rod member protruding from a main surface 71a farther than the horizontal plate 72 and the vertical plate 73.

The horizontal plates 72 are attached to the main surface 71a (the surface facing the work robot 1) of the base plate 71 at different height positions. Each horizontal plate 72 integrally has: a flange section 72a being in surface contact with the main surface 71a; a flat section 72b protruding from an upper end of the flange section 72a in a direction perpendicularly intersecting the main surface 71a; and a bent section 72c extending upward from an end edge of the flat section 72b that is opposite to the main surface 71a. The horizontal plate 72 is fixedly attached to the base plate 71 with the flange section 72a thereof fastened to the base plate 71 with rivets (not shown).

The vertical plates 73 are attached to the main surface 71a at regular intervals in the up-down direction and a left-right direction. Specifically, the vertical plates 73 are arranged in such a manner that the vertical plates 73 and the horizontal plates 72 are alternately arrayed from the top at associated positions in the left-right direction.

The protrusions 74 are attached to the main surface 71a at pitches similar to those of vertical plates 73. Specifically, each of the protrusions 74 is interposed between the horizontal plate 72 and the vertical plate 73 adjacent to each other in the up-down direction.

FIG. 1 to FIG. 3 show a state where the work tool 3 is used to apply the sealant S (FIG. 3) on a corner C1 where the main surface 71a of the base plate 71 and the flat section 72b of the horizontal plate 72 intersect with each other. As shown in these drawings, the distal end tool section 22a approaches the corner C1 from an oblique outside (obliquely upper side) in applying the sealant S on the corner C1. The distal end tool section 22a here is the nozzle 22a1 shown in FIG. 5A. In the application of the sealant S on the corner C1 as shown in FIG. 1 to FIG. 3, the main surface 71a of the base plate 71 corresponds to the "base surface" in the present invention, and the flat section 72b of the horizontal plate 72, specifically, a top surface of the flat section 72b, which defines the corner C1 with the main surface 71a corresponds to the "intersection surface" in the present invention.

The corner C1 has a long dimension in the left-right direction along a back edge (an edge on the side farther from the work robot 1) of the flat section 72b of the horizontal plate 72. Concerning the corner C1, a division enclosed between adjacent two vertical plates 73 in the left-right direction is defined as a work division R. The application of the sealant S on the corner C1 is performed per work division R. For instance, the work robot 1 performs the application of the sealant S from one work division R to another work division R in the left-right direction along the corner C1 while moving the work tool 3 in this order. Specifically, the aforementioned application work of the sealant S is performed in accordance with a control procedure to be described below.

Figure 8:
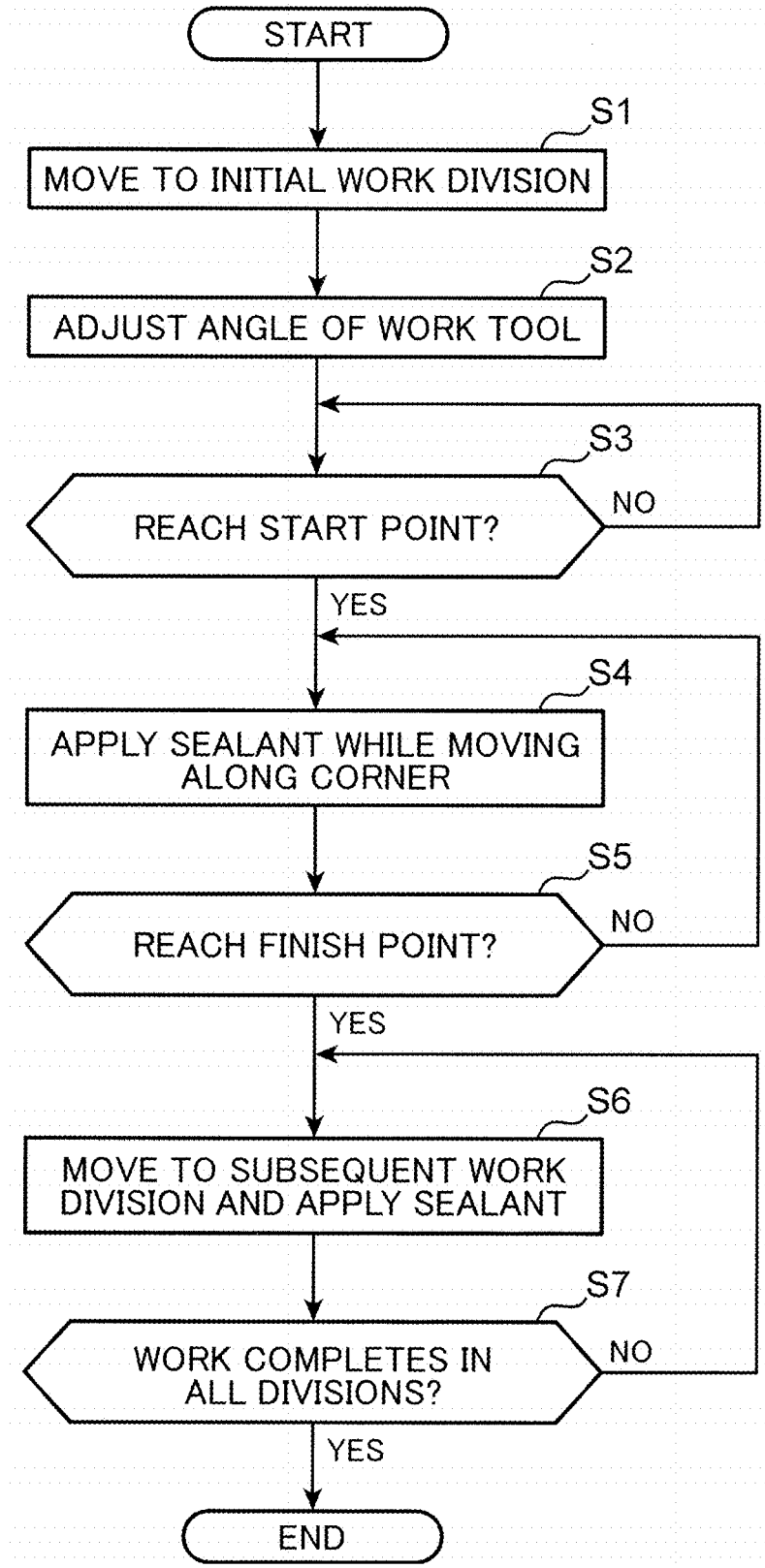
FIG. 8 is a flowchart showing a procedure of controls to be executed in a work of applying sealant by the work robot.

FIG. 8 is a flowchart showing a procedure of controls to be executed by the controller 50 to apply the sealant S on the corner C1. When the controls shown in this drawing are started, the controller 50 causes the work tool 3 to move to a work division R (hereinafter, referred to as an initial work division R) where the sealant S is to be firstly applied on the corner C1 (step S1). Specifically, the controller 50 causes the first to sixth arm links 11 to 16 to rotate or swing by driving the motors M1 to M6 of the robot main body 2 so that the distal end tool section 22a (here, the nozzle 22a1) of the work tool 3 moves to a position closer to the corner C1 in the initial work division R.

In particular, in step S1, the position and orientation of the head 16 are adjusted so that an extension line Lx of the central axis X6 of the head 16 substantially meets a tip of the second link 22 (tip of the distal end tool section 22a) at a time when the work tool 3 reaches the work division R.

The controller 50 adjusts the first angle $\theta1$ and the second angle $\theta2$ of the work tool 3 (step S2) concurrently with executing the control in step S1. Specifically, the controller 50 adjusts each of the first angle $\theta1$ between the head 16 and the first link 21 and the second angle $\theta2$ between the first link 21 and the second link 22 to a predetermined angle by driving the motors M7, M8 of the work tool 3. Each of the first angle $\theta1$ and the second angle $\theta2$ having been adjusted, that is, the predetermined angle is defined to satisfy three Conditions (i) to (iii) to be described below. The predetermined angle here may be obtained in advance through calculation based on, for example, shape data of the structure 70 and a positional relation between the work robot 1 and the structure 70.

(i) The work tool 3 avoids contact with the respective parts of the structure 70 in application of the sealant S within each work division R.

(ii) The distal end tool section 22a of the second link 22 approaches the corner C1 from an oblique outside. Specifically, arrangement of the second link 22 along a line obliquely extending upward from the corner C1 makes the second link 22 located away from both the two surfaces, i.e., the main surface 71a of the base plate 71 and the top surface of the flat surface section 72b of the horizontal plate 72, defining the corner C1 therebetween.

(iii) The first link 21 is inclined from the second link 22 inward, i.e., toward a side of approaching the horizontal plate 72. Specifically, when a line passing through an intersection (the second tool axis X8) of the center line Y1 of the first link 21 and the center line Y2 of the second link 22 and perpendicularly intersecting the main surface 71 is defined as a reference line L (FIG. 3), the center line Y1 of the first link 21 is closer to the flat section 72b of the horizontal plate 72 than (here, on a lower side of) the reference line L. In this arrangement, the second angle $\theta2$ between the first link 21 and the second link 22, that is, the second angle $\theta2$ being an intersection angle between the center line Y1 of the first link 21 and the center line Y2 of the second link 22 on the lower side, reaches less than 180° (approximately 90° in the drawing).

The angle adjustment (control in step S2) is performed before the work tool 3 reaches the initial work division R. Specifically, the controller 50 adjusts each of the first angle $\theta1$ and the second angle $\theta2$ to a predetermined angle satisfying Conditions (i) to (iii) before the distal end tool section 22a of the work tool 3 reaches the initial work division R (initial working position).

The angle adjustment under Conditions (i) to (iii) achieves entire compactification of the work tool 3 in combination with the adjustment of the position and orientation of the head 16 in step S1, i.e., the adjustment of causing the extension line Lx of the central axis X6 of the head 16 to substantially meet the tip of the second link 22. Specifically, the respective adjustments establish such a positional relation as to form a substantially triangle (see FIG. 3) defined among the extension line Lx of the central axis X6 of the head 16, the center line Y1 of the first link 21, and the center line Y2 of the second link 22. In other words, the center line Y1 of the first link 21 and the center line Y2 of the second link 22 intersect with the extension line Lx of the central axis X6 of the head 16 at an angle of less than 90°, and the center line Y1 of the first link 21 and the center line Y2 of the second link 22 intersect with each other at an angle of less than 180°. The establishment of the relation makes the entire dimension of the work tool 3 relatively small in a direction parallel to the central axis X6 of the head 16 and in a direction perpendicularly intersecting the central axis X6.

Here, the position and orientation of the head 16 having moved to the work division R are adjusted so that the extension line Lx of the central axis X6 substantially meets the tip of the second link 22 (tip of the distal end tool section 22a) in principle as described above. However, Conditions (i) to (iii) may be dissatisfied depending on a shape of the workpiece in a state of keeping the positional relation between the head 16 and the distal end tool section 22a. In this case, the extension line Lx of the central axis X6 of the head 16 is permitted, in step S1, to deviate from a desired position (where the extension line substantially meets the tip of the distal end tool section 22a). That is to say, Conditions (i) to (iii) are prioritized over the positional relation between the head 16 and the distal end tool section 22a. In difficulty of establishing the positional relation between the head 16 and the distal end tool section 22a where the tip of the distal end tool section 22a substantially meets the extension line Lx, the position and orientation of the head 16 are adjusted to allow the distal end tool section 22a to approach the extension line Lx as close as possible within a range satisfying Conditions (i) to (iii). In other words, a posture of the second link 22 is adjusted so that at least the tip thereof is closer to the extension line Lx.

Figure 9:
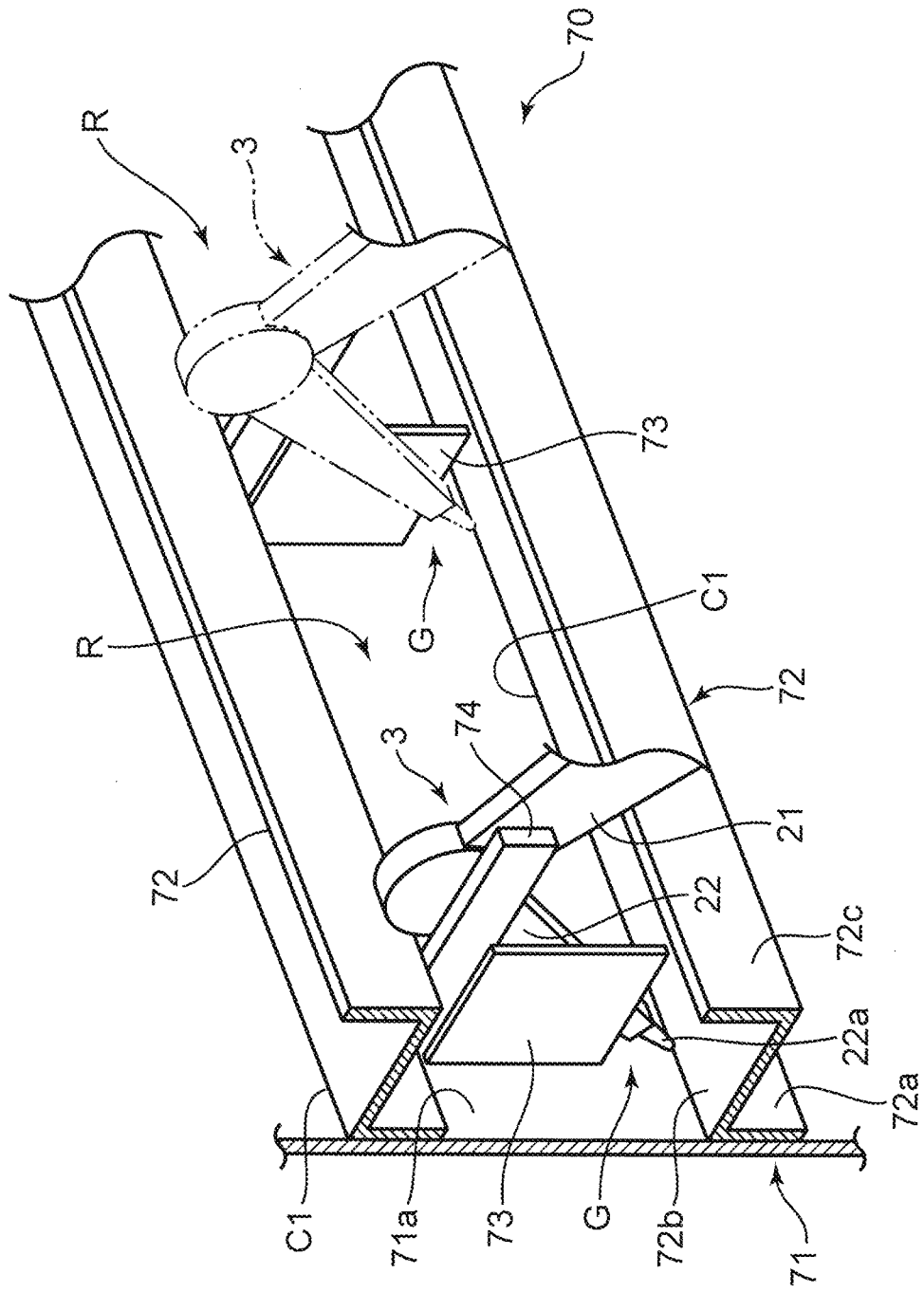
FIG. 9 shows a movement of the work tool from a start to a finish of the work of applying the sealant in a specific one work division.

Next, the controller 50 determines whether the distal end tool section 22a reaches a start point of the application work (position where the application of the sealant S is started) in the initial work division R (step S3). In the embodiment, the application work of the sealant S in the work division R is continuously performed from one end to another end (from the left end to the right end in the drawings) on the corner C1 in the work division R in the left-right direction as shown in FIG. 9. The start point in this case corresponds to the one end on the corner C1 in the work division R and represents a position where the work tool 3 denoted by a solid line applies the sealant S. On the other hand, another end on the corner C1, that is, a position where the work tool 3 denoted by a chain double-dashed line applies the sealant S represents a finish point where the application work is finished.

When the determination is made YES in step S3 and the distal end tool section 22a is confirmed to reach the start point of the application work, the controller 50 executes the application of the sealant S on the corner C1 while moving the distal end tool section 22a along the corner C1 from the start point (step S4). Specifically, the controller 50 executes the application of the sealant S on the corner C1 by ejecting the sealant S from the distal end tool section 22a (here, the nozzle 22a1) at a constant rate and moving the distal end tool section 22a from the one end (start point) to another end (finish point) along the corner C1 at a given speed. At this time, each of the first angle θ1 and the second angle θ2 of the work tool 3 is not changed and kept at the adjusted angle (predetermined angle) in step S2. In other words, the controller 50 executes the application of the sealant S within the same work division R by moving the distal end tool section 22a along the corner C1 while keeping the first angle θ1 and the second angle θ2 of the work tool 3.

Then, the controller 50 determines whether the distal end tool section 22a reaches the finish point of the application work, that is, another end on the corner C1 where the application of the sealant S is finished (step S5).

When the determination is made YES in step S5 and the distal end tool section 22a is confirmed to reach the finish point, the controller 50 moves the work tool 3 to a subsequent work division R and executes, after the movement, application of the sealant S on the corner C1 in the subsequent work division R in the same order of steps S3 to S5 (step S6). At this time, the position and orientation of the head 16 is set, in the same manner as in step S1, so that the extension line Lx of the central axis X6 of the head 16 substantially meets the tip of the second link 22 (tip of the distal end tool section 22a) of the work tool 3 (see FIG. 3).

A destination of the work tool 3 to be moved in step S6 is set to another work division R closest to the finish point of the current work division R. For instance, when the sealant S is applied while the distal end tool section 22a is moved from the left to the right in the current work division R as shown in FIG. 9, the destination of the work tool 3 is set to a work division R adjacent to the right of the current work division R in principle. When the current work division R indicates a rightmost work division R in the structure 70, another work division R adjacent to the current work division R at an upper or lower position thereof is selected as the work division at the destination.

When the work tool 3 is moved in the adjacent work division R in the above-described manner, the work tool 3 is moved at a shortest distance within a range of avoiding contact with structural elements (in particular, the vertical plate 73 and the protrusion 74 located in the adjacent work division R) existing in the vicinity of a movement route of the tool. The movement between the work divisions R is performed while the first angle θ1 and the second angle θ2 of the work tool 3 are kept. In other words, the angles θ1, θ2 of the work tool 3 are kept unchanged until the application of the sealant S in all the work divisions R is completed. Needless to say, this does not intend to exclude exceptional change of each angle that is inevitable in a specific situation in terms of a shape and a structure of the structure 70.

Subsequently, the controller 50 determines whether the application work of the sealant S in all the work divisions R in the structure 70 is completed (step 7). When the determination is made NO, the application work of the sealant S is performed in a remaining work division R in the same manner. When the determination is made YES, the series of controls is finished there.

Although omitted in the description above, the work divisions R are partitioned from each other by the vertical plates 73. Therefore, each of the start point and the finish point on the corner C1 in each work division R comes under the corresponding vertical plate 73. The distal end tool section 22a of the work tool 3 is required to enter a gap existing under the vertical plate 73, that is, enter a gap G (FIG. 9) between a lower end of the vertical plate 73 and the flat section 72b of the horizontal plate 72, to apply the sealant S on each point. However, this operation is basically attainable only by slightly rotating the head 16 about the central axis X6 thereof. Specifically, in the embodiment, the robot main body 2 takes such a posture that the extension line Lx of the central axis X6 of the head 16 substantially meets the tip of the distal end tool section 22a in the application work of the sealant S within each work division R (see FIG. 3). Hence, the head 16 may be slightly rotated to tilt the second link 22 in a state of the work tool 3 having moved very close to the vertical plate 73 as shown in FIG. 9 so that the distal end tool section 22a enters the gap G. In other words, the controller 50 permits the distal end tool section 22a of the work tool 3 to enter the gap G by slightly rotating the head 16 at the start or finish of the application of the sealant in each work division R. In this manner, the sealant S can be applied over a whole range of the corner C1 without any void.

Other Work Examples

Heretofore, described in detail is the example where the work robot 1 applies the sealant S on the corner C1 in the structure 70, that is, on the corner C1 where the main surface 71a of the base plate 71 and the flat section 72b of the horizontal plate 72 intersect with each other. However, the sealant S can be applied on other portion demanding a sealing property. For example, in the embodiment where the flange section 72a of the horizontal plate 72 is fastened to the base plate 71 with the rivets, there is a demand for applying the sealant S over a whole periphery of the flange section 72a to prevent water from entering a gap between the flange section 72a and the base plate 71. To meet the demand, the sealant S is applied to portions on the periphery of the flange section 72a, that is, a lower edge, and left and right end edges of the flange section 72a as well as the corner C1. Moreover, in a case where the vertical plate 73 is fastened to the base plate 71 with rivets, the sealant S is applied on peripheries of facing surfaces thereof for the fastening.

A target (workpiece) to be subjected to the application of the sealant S is not limited to the above-described structure 70. For instance, a structure 80 shown in FIG. 10 may subjected to the application of the sealant S. The structure 80 shown in this drawing includes a base plate 81 which is flat, and a disc-shaped member 82 fastened to a main surface 81a of the base plate 81 with rivets (not shown). In this case, the work robot 1 applies the sealant S on a corner C2 where a circumferential surface 82a of the disc-shaped member 82 and the main surface 81a of the base plate 81 intersect with each other. The main surface 81a corresponds to the "base surface" in the present invention, and the circumferential surface 82a corresponds to the "intersection surface" in the present invention.

Figure 10:
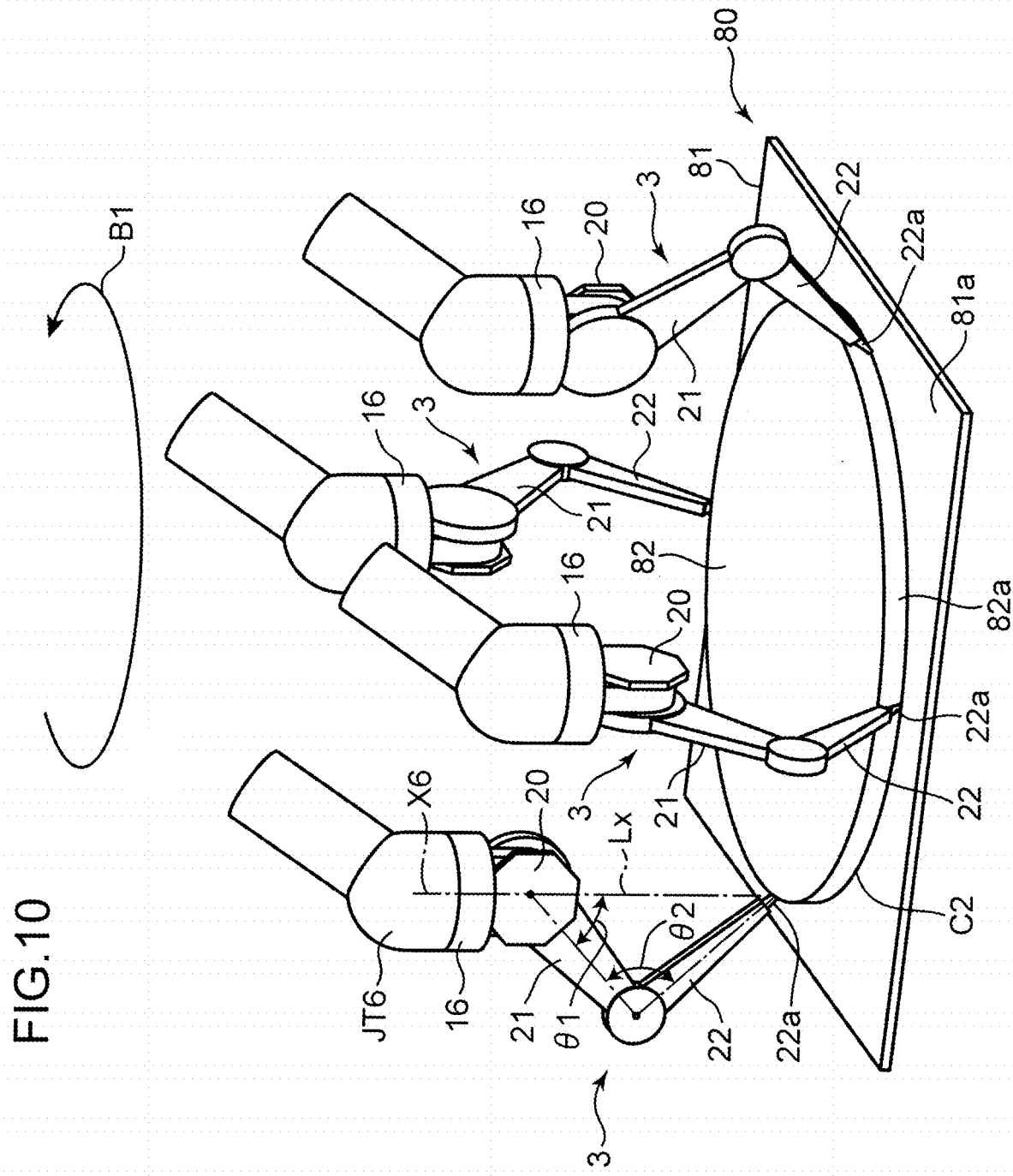
FIG. 10 shows an example change in an application target of the sealant.

The corner C2 endlessly extends along the circumferential surface 82a of the disc-shaped member 82. For the application of the sealant S on the corner C2 extending in this manner, the controller 50 first adjusts each of the first angle θ1 and the second angle θ2 of the work tool 3 to an angle as shown in FIG. 10, and then executes the application of the sealant S on the corner C2 by moving the distal end tool section 22a of the work tool 3 in a circle along the corner C2, as denoted by arrow B 1. Each of the first angle θ1 and the second angle θ2 at this time is set to a predetermined angle to allow the distal end tool section 22a to approach the corner C2 from an oblique outside and allow the first link 21 to be inclined (here, inclined radially inward) from the second link 22 toward the circumferential surface 82a. The adjustment of the first and second angles θ1, θ2 is performed before movement to an initial working position on the corner C2, and the first and second angles θ1, θ2 are kept unchanged in principle during the application of the sealant S on the corner C2.

Figure 5B:
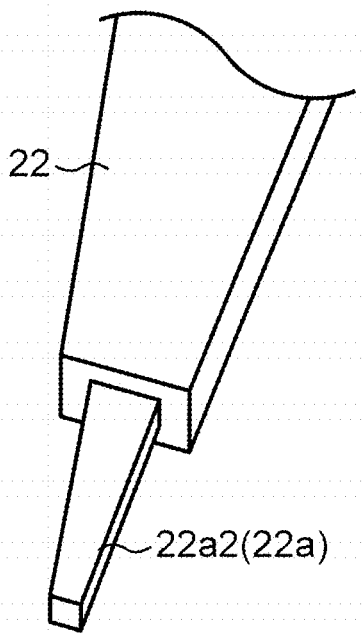
FIG. 5B shows a spatula attached to the distal end.

The work robot 1 having applied the sealant S on the structure 70 (or 80) in the above-described manner may further perform a work of smoothing the sealant S having been applied. For the smoothing work, the spatula 22a2 shown in FIG. 5B is adopted as the distal end tool section 22a of the work tool 3. The spatula 22a2 is moved along the shape (e.g., the corner C1 or C2) of the application target of the sealant S in the same manner as the distal end tool section 22a (nozzle 22a1) adopted in the application of the sealant. Consequently, unevenness on a surface of the sealant S having been applied is removed to smooth the sealant S.

Operational Effects

As described above, in the embodiment, the work tool 3 including the first link 21 and the second link 22 is attached to the head 16 of the robot main body 2 that can three dimensionally move, and each of the first angle θ1 between the head 16 and the first link 21 and the second angle θ2 between the first link 21 and the second link 22 is changeable. This configuration has an advantage of efficient performance of the work of applying (or smoothing) the sealant on various kinds of workpieces having different shapes while avoiding contact with each workpiece.

Specifically, in the embodiment, the work tool 3 having two degrees of freedom for changing the first angle θ1 and the second angle θ2 is attached to the head 16 of the robot main body 2. Therefore, adjustment of both the first angle θ1 and the second angle θ2 in conformity with the shape of the workpiece, such as the structure 70, 80, succeeds in ensuring a maximally long division where the work is continuously performable without contact between the work tool 3 and the workpiece and increasing the work efficiency. For instance, although partition into work divisions is indispensable for the work of applying or smoothing the sealant S on the corner C1 in the structure 70 to avoid contact with the vertical plate 73, the continuity of the work in each work division R is favorable. Specifically, even if an obstruction Z denoted by a chain double-dashed line in FIG. 1 exists, preliminary adjustment of each of the first angle θ1 and the second angle θ2 to an angle (each angle shown in FIG. 1 to FIG. 3) at which contact with the obstruction Z is avoidable leads to achievement of continuous performance of the work in each work division R with the angles θ1, θ2 being kept. In other words, it is possible to avoid a decrease in a division length for the continuous performance of the work attributed to the existence of the obstruction Z, and accordingly, the work efficiency can be increased as great as possible. In contrast, use of a tool which cannot change an angle, like a work tool 130 shown in FIG. 11 for example, inevitably limits a posture of each of the work tool 130 and a robot main body 2. This may impede, for example, continuous performance of the work on the corner C1 in the structure 70 to avoid the contact with the obstruction Z (FIG. 1), resulting in a possible reduction in the work efficiency. The embodiment contrarily achieves efficient performance of the work while avoiding the aforementioned reduction.

Moreover, in the embodiment, the robot main body 2 is controlled in such a manner that each of the first angle θ1 and the second angle θ2 is adjusted to a predetermined angle satisfying the conditions including avoidance of the contact with the workpiece, such as the structure 70, 80, before the work tool 3 (the distal end tool section 22a thereof) moves to the initial working position of the workpiece, and that the distal end tool section 22a moves along the shape of the workpiece (e.g., the shape of the corner C1, C2) while keeping the angels θ1, θ2 after the movement to the initial working position. This configuration only requires the head 16 to move along the shape of the workpiece under the drive control of the robot main body 2 without the necessity of changing the first angle θ1 and the second angle θ2 after the work tool 3 reaches the initial working position, and therefore can efficiently perform the work while favorably ensuring positional accuracy of the distal end tool section 22a.

In the embodiment, in the work on the corner in the structure 70 (80), e.g., on the corner C1 (C2) defined between the main surface 71a (81a) facing the head 16 and the intersection surface (the flat section 72b or the circumferential surface 82a), the first angle θ1 and the second angle θ2 are adjusted to allow the distal end tool section 22a to approach the corner C1 (C2) from the oblique outside and allow the first link 21 to be inclined from the second link 22 toward the intersection surface (72b, 82a). This configuration permits the center of the head 16 to approach the corner C1, C2 serving as a working portion in a directional view along the central axis X6 of the head 16, and can enhance the controllability in moving the distal end tool section 22a along the corner C1, C2. Furthermore, in the work on a working portion having an arc-shape like the corner C2 (FIG. 10) of the structure 80, this configuration can decrease a movement distance of the head 16 to move the distal end tool section 22a along the corner C2 and increase the work efficiency more effectively than a provisional configuration where the first link 21 is inclined (here, inclined radially outward) from the second link 22 in an opposite direction to the direction shown in the drawings.

In particular, the embodiment where the work is performed in the state where the extension line Lx of the central axis X6 of the head 16 substantially meets the tip of the distal end tool section 22a can facilitate the positioning of the head 16 with respect to the corner C1 (C2) in, for example, moving the distal end tool section 22a along the corner C1 (C2), and accordingly can enhance the positional accuracy at the movement of the head 16 and the work tool 3. Specifically, in the directional view along the central axis X6 of the head 16, the positioning of the head 16 to allow the center of the head 16 to substantially meet the corner C1 (C2) leads to the facilitated positioning of the head 16 with respect to the corner C1 (C2). In addition, moving the head 16 in such a manner as to maintain the positional relation leads to achievement of moving the distal end tool section 22a exactly along the corner C1 (C2) and enhancing the positional accuracy.

Modifications

Although used is the work tool 3 having the two degrees of freedom for changing the first angle θ1 being an angle between the center line Y1 of the first link 21 and the central axis X6 of the head 16 and the second angle θ2 between the center line Y2 of the second link 22 and the center line Y1 of the first link 21 in the embodiment, the work tool does not necessarily have two degrees of freedom and may have one degree of freedom. Specifically, only the first angle θ1 may be changeable and the second angle θ2 may be unchangeable by fixing the first link 21 and the second link 22 to each other in a state of intersecting with each other at a predetermined angle. However, in this case, on the condition that at least the first angle θ1 falls within a specific angle range, the first link 21 and the second link 22 may be formed in such a manner that the center line Y1 of the first link 21 and the center line Y2 of the second link 22 intersect with the extension line Lx of the central axis X6 of the head 16, and that the tip of the second link 22 is closer to the extension line Lx. In this manner, the work tool 3 becomes entirely compact, and thus can avoid the contact with the workpiece owing to the adjustment of an intersection angle (first angle θ1) between the central axis of the head 16 and the first link 21. Furthermore, the tip of the second link 22 substantially meets or approaches the extension line Lx, resulting in achievement of facilitated positioning of the head 16 to a working portion and enhancement of the positional accuracy at the time of moving the head 16 and the work tool 3.

Although described is the example where the work robot 1 is used to perform the work of applying the sealant S on the workpiece or smoothing the sealant S having been applied in the embodiment, the usage of the multi-axis robot or the work tool according to the present invention is not limited thereto. The multi-axis robot or the work tool according to the present invention is adoptable for various works each demanding movement along a shape of a workpiece. For instance, the multi-axis robot or the work tool according to the present invention is favorably adoptable for a work of painting a workpiece and a burr removal work of removing burrs occurring in a certain portion of the workpiece.

Although described is the example where the work tool 3 is attached to the robot main body 2 of the six-axis type, a robot main body to which the work tool according to the present invention is attachable is not limited to the six-axis type, but may be a robot main body of another type as long as the robot main body can three-dimensionally move the head. For instance, the work tool according to the present invention may be attached to an articulated robot having fewer than six joints or more than six joints, or to a cartesian robot.

CONCLUSION

The embodiment covers each invention including the configuration to be described below.

A first invention relates to a multi-axis robot that performs a predetermined work while moving along a shape of a workpiece, the multi-axis robot including: a robot main body including a head and a movement mechanism that three-dimensionally moves the head; and a work tool attached to the head. The work tool includes: a first link pivotally supported on the head; a second link pivotally supported on a distal end of the first link; a first change mechanism that changes a first angle being an angle of the first link to a central axis of the head; and a second change mechanism that changes a second angle being an angle of the second link to the first link.

According to the first invention, the work tool having two degrees of freedom for changing the first angle and the second angle is attached to the head of the robot main body. Therefore, adjustment of both the first angle and the second angle in conformity with the shape of the workpiece succeeds in ensuring a maximally long division where the work is continuously performable without contact between the work tool and the workpiece and increasing the work efficiency for various kinds of workpieces.

Preferably, the multi-axis robot further includes a controller that controls the movement mechanism, the first change mechanism, and the second change mechanism. The controller executes: a first control of moving a tip of the second link to an initial working position of the workpiece; a second control of adjusting each of the first angle and the second angle to a predetermined angle before the tip of the second link reaches the initial working position; and a third control of moving the tip of the second link from the initial working position along the shape of the workpiece while keeping the first angle and second angle.

This configuration only requires the head to move along the shape of the workpiece under the drive control of the robot main body without the necessity of changing the first angle and the second angle after the work tool reaches the initial working position, and therefore can efficiently perform the work while favorably ensuring the positional accuracy of the tip of the second link.

The workpiece may include a corner defined between a base surface and an intersection surface intersecting with the base surface. In this case, the first angle and the second angle having been adjusted under the second control preferably allows the tip of the second link to approach the corner from an oblique outside and allow the first link to be inclined from the second link toward the intersection surface.

This configuration permits the center of the head to approach the corner serving as a working portion in a directional view along the central axis of the head, and can enhance the controllability in moving the tip of the second link along the corner. Furthermore, in the work on a corner having an arc-shape, this configuration can decrease a movement distance of the head to move the tip of the second link along the corner, and increase the work efficiency.

Preferably, the controller executes the third control in a state where an extension line of the central axis of the head meets the tip of the second link.

This configuration can facilitate positioning of the head with respect to the working portion, such as the corner, and enhance the positional accuracy at the time of moving the head and the work tool. Specifically, in the directional view along the central axis of the head, the positioning of the head to allow the center of the head to substantially meet the working portion leads to the facilitated positioning of the head with respect to the working portion. In addition, moving the head in such a manner as to maintain the positional relation leads to achievement of moving the tip of the second link exactly along the working portion and enhancing the positional accuracy.

The second link preferably includes a nozzle at a distal end thereof to apply sealant on the workpiece. Alternatively, the second link may include a spatula at the distal end thereof to smooth the sealant applied on the workpiece.

This configuration attains efficient performance of each of the work of applying the sealant on the workpiece and the work of smoothing the sealant having been applied.

A second invention relates to a work tool to be attached to a head of a multi-axis robot that moves along a shape of a workpiece, the work tool including: a first link pivotally supported on the head; a second link pivotally supported on a distal end of the first link; a first change mechanism that changes a first angle being an angle of the first link to a central axis of the head; and a second change mechanism that changes a second angle being an angle of the second link to the first link.

The work tool according to the second invention exerts the same effects as those of the above-described first invention when adopted in a multi-axis robot.

A third invention relates to a method for controlling the multi-axis robot, the method including: a first step of moving a tip of the second link to an initial working position of the workpiece; a second step of adjusting each of the first angle and the second angle to a predetermined angle before the tip of the second link reaches the initial working position; and a third step of moving the tip of the second link from the initial working position along the shape of the workpiece while keeping the first angle and second angle.

The third invention achieves efficient performance of the work while favorably ensuring the positional accuracy of the tip of the second link.

Preferably, the workpiece includes a corner defined between a base surface and an intersection surface intersecting with the base surface, and the first angle and the second angle are adjusted to allow the tip of the second link to approach the corner from an oblique outside and allow the first link to be inclined from the second link toward the intersection surface in the second step.

In this manner, the controllability in moving the tip of the second link along the corner can be enhanced.

The tip of the second link is preferably moved in a state where an extension line of the central axis of the head substantially meets the tip of the second link in the third step.

Accordingly, the positional accuracy at the time of moving the head and the work tool can be enhanced.

A fourth invention relates to a multi-axis robot that performs a predetermined work while moving along a shape of a workpiece, the multi-axis robot including: a robot main body including a head and a movement mechanism that three-dimensionally moves the head; and a work tool attached to the head. The work tool includes: a first link pivotally supported on the head; a second link extending from a distal end of the first link in a direction different from a central axis of the first link; and a change mechanism that changes a first angle being an angle of the central axis of the first link to a central axis of the head. The change mechanism adjusts the first angle in such a manner that a center line of the first link and a center line of the second link intersect with an extension line of the central axis of the head, and that a tip of the second link is closer to the extension line.

According to the fourth invention, established is such a positional relation as to form a substantially triangle shape among the extension line of the central axis of the head, the center line of the first link, and the center line of the second link. In this manner, the work tool becomes entirely compact, and thus can easily avoid the contact with the workpiece owing to the adjustment of an intersection angle between the central axis of the head and the first link. Furthermore, the tip of the second link substantially meets or approaches the extension line, resulting in achievement of facilitated positioning of the head to a working portion and enhancement of the positional accuracy at the time of moving the head and the work tool.

A fifth invention relates to a work tool to be attached to a head of a multi-axis robot that moves along a shape of a workpiece, the work tool including: a first link pivotally supported on the head; a second link extending from a distal end of the first link in a direction different from a central axis of the first link; and a change mechanism that changes a first angle being an angle of the central axis of the first link to a central axis of the head. The change mechanism adjusts the first angle in such a manner that a center line of the first link and a center line of the second link intersect with an extension line of the central axis of the head, and that a tip of the second link is closer to the extension line.

The work tool according to the fifth invention exerts the same effects as those of the above-described first invention when adopted in a multi-axis robot.

The invention claimed is:

1. A multi-axis robot that performs a predetermined work while moving along a shape of a workpiece, the multi-axis robot comprising:
   a robot main body including a head and a movement mechanism that three-dimensionally moves the head;
   a work tool attached to the head; and
   a controller, wherein
   the work tool includes:
   a first link pivotally supported on the head;
   a second link pivotally supported on a distal end of the first link;
   a first change mechanism that changes a first angle being an angle of the first link to a central axis of the head; and
   a second change mechanism that changes a second angle being an angle of the second link to the first link,
   the controller controls the movement mechanism, the first change mechanism, and the second change mechanism, and
   the controller executes:
   a first control of moving a tip of the second link to an initial working position of the workpiece;
   a second control of adjusting each of the first angle and the second angle to a predetermined angle before the tip of the second link reaches the initial working position; and
   a third control of moving the tip of the second link from the initial working position along the shape of the workpiece while keeping the first angle and second angle.

2. The multi-axis robot according to claim 1, wherein the workpiece includes a corner defined between a base surface and an intersection surface intersecting with the base surface, and
   the first angle and the second angle having been adjusted under the second control allow the tip of the second link to approach the corner from an oblique outside and allow the first link to be inclined from the second link toward the intersection surface.

3. The multi-axis robot according to claim 1, wherein the controller executes the third control in a state where an extension line of the central axis of the head substantially meets the tip of the second link.

4. The multi-axis robot according to claim 1, wherein the second link includes a nozzle at a distal end thereof to apply sealant on the workpiece.

5. The multi-axis robot according to claim 1, wherein the second link includes a spatula at a distal end thereof to smooth sealant applied on the workpiece.

6. A method for controlling the multi-axis robot according to claim 1, comprising:
   a first step of moving a tip of the second link to an initial working position of the workpiece;
   a second step of adjusting each of the first angle and the second angle to a predetermined angle before the tip of the second link reaches the initial working position; and
   a third step of moving the tip of the second link from the initial working position along the shape of the workpiece while keeping the first angle and second angle.

7. The method according to claim 6, wherein
the workpiece includes a corner defined between a base surface and an intersection surface intersecting with the base surface, and
the first angle and the second angle are adjusted to allow the tip of the second link to approach the corner from an oblique outside and allow the first link to be inclined from the second link toward the intersection surface in the second step.

8. The method according to claim 6, wherein
the tip of the second link is moved in a state where an extension line of the central axis of the head substantially meets the tip of the second link in the third step.

9. A multi-axis robot that performs a predetermined work while moving along a shape of a workpiece, the multi-axis robot comprising:
a robot main body including a movable head;
a work tool attached to the head; and
circuitry configured to control, wherein
the work tool includes:
a first link pivotally supported on the head;
a second link pivotally supported on a distal end of the first link;
a first joint to change a first angle being an angle of the first link to a central axis of the head; and
a second joint to change a second angle being an angle of the second link to the first link,
the circuitry controls a position of the head, the first joint, and the second joint, and
the circuitry executes:
a first control of moving a tip of the second link to an initial working position of the workpiece;
a second control of adjusting each of the first angle and the second angle to a predetermined angle before the tip of the second link reaches the initial working position; and
a third control of moving the tip of the second link from the initial working position along the shape of the workpiece while keeping the first angle and second angle.

10. The multi-axis robot according to claim 9, wherein:
the workpiece includes a corner defined between a base surface and an intersection surface intersecting with the base surface, and
the first angle and the second angle having been adjusted under the second control allow the tip of the second link to approach the corner from an oblique outside and allow the first link to be inclined from the second link toward the intersection surface.

11. The multi-axis robot according to claim 9, wherein:
the circuitry executes the third control in a state where an extension line of the central axis of the head substantially meets the tip of the second link.

12. The multi-axis robot according to claim 9, wherein:
the second link includes a nozzle at a distal end thereof to apply sealant on the workpiece.

13. The multi-axis robot according to claim 9, wherein:
the second link includes a spatula at a distal end thereof to smooth sealant applied on the workpiece.

14. A method for controlling a multi-axis robot, comprising:
moving a tip of a second link which is pivotally supported on a distal end of a first link which is supported on a head which has a work tool attached thereto to an initial working position of a workpiece;
adjusting each of a first angle of a first link to a central axis of the head and the second angle of a second link to the first link to a predetermined angle before the tip of the second link reaches the initial working position; and
moving the tip of the second link from the initial working position along a shape of the workpiece while keeping the first angle and second angle.

15. The method according to claim 14, wherein:
the workpiece includes a corner defined between a base surface and an intersection surface intersecting with the base surface, and
the first angle and the second angle are adjusted to allow the tip of the second link to approach the corner from an oblique outside and allow the first link to be inclined from the second link toward the intersection surface in the second step.

16. The method according to claim 14, wherein:
the tip of the second link is moved in a state where an extension line of the central axis of the head substantially meets the tip of the second link in the moving the tip of the second link from the initial working position along the shape of the workpiece.

* * * * *